Nov. 22, 1960   W. WRIGHT   2,961,224
PUG-MILL MIXER FOR ASPHALT PLANT
Filed Sept. 18, 1958
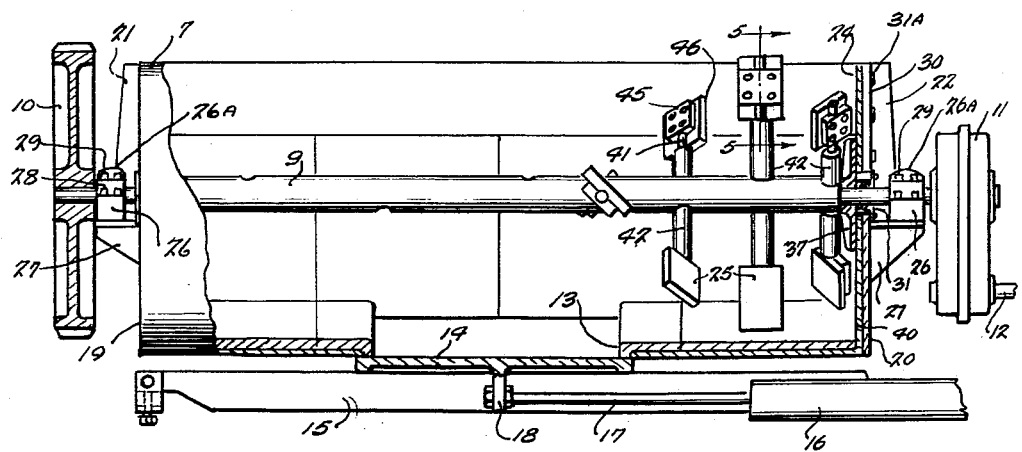
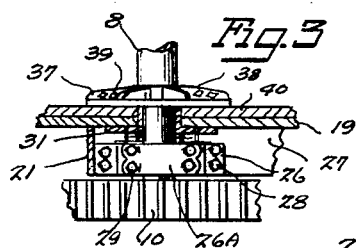
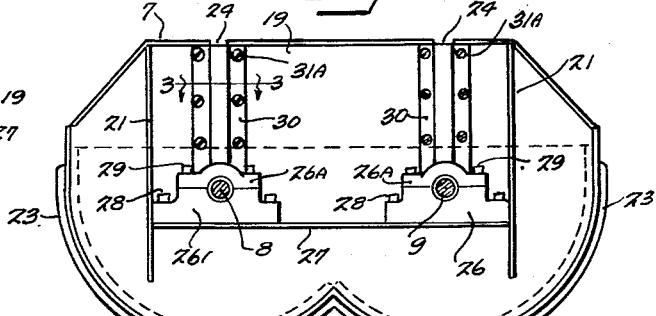
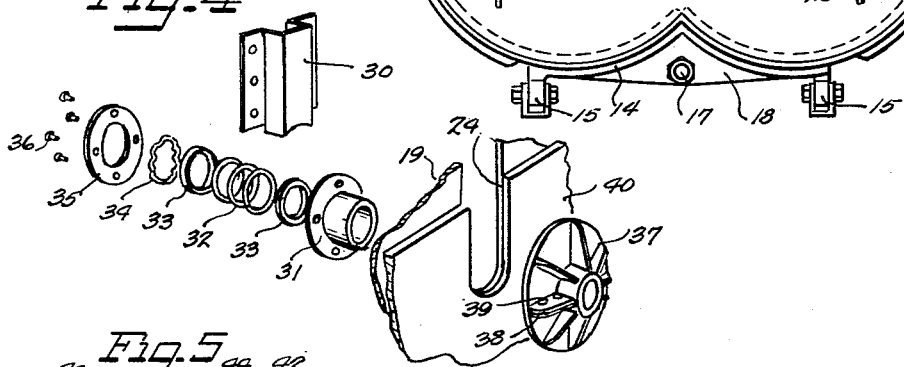
Inventor
WILBUR WRIGHT
By Edward M. Apple
Atty United States Patent Office 2,961,224
Patented Nov. 22, 1960

2,961,224

PUG-MILL MIXER FOR ASPHALT PLANT

Wilbur Wright, 3800 Wood St., Lansing, Mich.

Filed Sept. 18, 1958, Ser. No. 761,891

3 Claims. (Cl. 259—104)

This invention relates to asphalt making machinery, and has particular reference to a pug-mill mixer for an asphalt plant, such as disclosed in my copending application, Serial No. 761,871, filed September 18, 1958, of which this application is a continuation in part, although the principles of the invention may be used with any type of asphalt plant.

In presently known pug-mill mixers the large drive shafts required to operate them are difficult to align and keep sealed, and when a breakdown occurs, the shaft must be removed by sliding it end-wise through the bearings, and then only after the paddle assemblies are first removed. Such an operation is difficult and time consuming. Further than that, it is difficult to adjust the tip clearance, and angles of incidence, of the mixer paddles now known to the public, for the reason that the presently known paddle anchoring means, because of their construction, are limited in their adjustments. It is therefore an object of this invention to obviate the foregoing difficulties.

Another object of the invention is to generally improve pug-mill mixers and to provide a mixer, which has a novel shaft seal, which will prevent the hot bitumen material from leaking from the mixer onto other equipment, or personnel.

Another object of the invention is to provide a pug-mill mixer, which is constructed with spring loaded shaft seal members, which exert a primary axial pressure on the sealing members, which in turn creates a radial pressure between said seal members and the shaft, and between the seal members and the seal housing, to effect a better seal.

Another object of the invention is to provide a mixer with flinger wheels, arranged to break up and disperse large masses of asphalt, near the end of the drive shafts, which would normally be forced into the seals.

Another object of the invention is to provide a mixer of the type indicated, which is constructed with novel means, whereby the drive shafts may easily be removed and replaced.

Another object of the invention is to provide a pug-mill mixer, which is constructed so that the shaft assembly may be lifted out, without disturbing the paddles, and without disturbing the basic alignment of the shaft bearings.

Another object of the invention is to provide a pug-mill mixer, with improved means for anchoring the paddles, whereby complete adjustment may be made of the tip clearance, and angle of incidence of the paddles.

The foregoing and other objects and advantages of the invention will become more apparent as the description proceeds, reference being made from time to time, to the accompanying drawing, forming part of the within disclosure, in which drawing:

Fig. 1 is a section taken through a pug-mill mixer, embodying my invention.

Fig. 2 is a left end, elevational view of the device shown in Fig. 1 with the timing gears removed.

Fig. 3 is a section taken substantially on the line 3—3 of Fig. 2.

Fig. 4 is a blown up view of the shaft seal assembly, showing the end wall and flinger wheel.

Fig. 5 is an enlarged fragmentary view, partly in section, taken substantially on the line 5—5 of Fig. 1.

Referring now more particularly to the drawing, it will be understood that in the embodiment herein disclosed, the reference character 7 indicates, in general, the housing of the pug-mill mixer, which is mounted in, and supported by, the tower section of the asphalt plant. The housing 7 is made of a suitable metal, to withstand the abrading action of the materials, which make up an asphalt mix. The housing 7 is of sufficient size to accommodate a pair of drive shafts 8 and 9, which are synchronized for rotation, by the timing gears 10, and are driven by means of a gear reduction 11, through the shaft 12, by any suitable motive force (not shown). The bottom wall of the housing 7 has an opening 13, which is normally closed by a gate 14, which slides on tracks 15, and is actuated by means of a hydraulic cylinder 16, the plunger 17 of which, connects to a boss 18, which forms a part of the gate 14.

The housing 7 is closed at each end, by means of end plates 19 and 20, which are secured to the housing by any suitable means. The end plates 19 and 20 are reinforced by means of gussets 21 and 22. The housing 7 is heated as in conventional practice, by means of a jacket 23, which is supplied with hot oil from a suitable source (not shown).

Each end wall 19 and 20 is slotted, as at 24, Fig. 2, so that the shafts 8 and 9 may be lifted vertically from their bearings, as hereinafter described. This is an important feature of the invention as it permits the shafts 8 and 9 to be removed and replaced, without the necessity of dismantling the paddles 25.

Each shaft rotates in a pair of pillow blocks 26, each pillow block having a removable cover 26A. Each pillow block and cover constitutes a split bearing, for one end of the shafts 8 and 9. The pillow blocks 26 are secured to the brackets 27 by means of bolts 28. The covers 26A are secured to the pillow blocks 26 by means of bolts 29. The openings 24, in the end members 19 and 20, are closed by means of filler plates 30, which are bolted, as at 31A to the end members 19 and 20, thus it will be seen that each of the shafts 8 and 9, may be lifted from the housing 7, by the simple expedient of removing its pillow block covers 26A and filler plates 30. This is an important feature of the invention, as it permits the removal of the drive shafts without the necessity of disturbing the paddle assemblies.

Each shaft 8 and 9 is provided, at either end, with a shaft seal, the components of which are shown in Fig. 4, and which include a seal housing 31, which rests at the bottom of the opening 24 formed in the end member 19 and on which rests the lower end of the filler plate 30. The other elements of the shaft seal include a plurality of "plastic" rings 32 preferably made of a polytetrafluoroethylene polymer, or the like, washers 33, one or more spring rings 34, and an end plate 35, which is secured to the seal housing 31, by means of machine screws 36, or other suitable means. The spring ring 34 exerts axial pressure on the rings 32, which in turn develops radial pressure on the rings, causing them to closely seal the space between the shaft and the seal housing. This structure also permits the washers to rotate with the shaft and enables them to flex or slide back and forth along the shaft, thereby taking up any gap that may develop from wear or heat expansion.

To further protect the shaft seal, I provide a flinger wheel 37 (Fig. 4), near each end of each shaft 8 and 9, on the inside of the housing 7. The flinger wheels 37 are split in the center, as at 38, and are bolted together as at 39. The flinger wheels 37 rotate with the shafts, and tend to break up heavy masses of bitumen, which might collect near the end of the shafts and normally be forced into the shaft seal. This is another important feature of the invention, as it tends to minimize the leakage of hot bitumen into the shaft seal. Each flinger wheel 37 is backed up with a wear plate 40.

Another important feature of the invention resides in the manner in which I mount the paddles 25 on the shafts 8 and 9. Each paddle 25 is mounted at the end of a spindle 41. Each spindle 41 being provided with a wear sleeve (Fig. 5). Each spindle 41 is provided with a plurality of peripheral grooves 43, near its free end, which grooves are arranged to accommodate the Allen head machine screws 44, which secure the two parts 45 and 46 of the paddle together. This arrangement permits the paddles to be adjusted longitudinally on the spindles 41, by simply using different pairs of peripheral grooves 43. It also permits a fine adjustment of the angle of incidence of each paddle. With this anchoring means, close adjustment can be made of the paddle tip clearance, and any angle of adjustment of the paddle may be obtained.

It is believed that the operation of the device is obvious from the foregoing description.

Having described my invention, what I claim and desire to secure by Letters Patent is:

1. In a pug-mill mixer comprising a housing having slotted end plates and having drive shafts with paddles mounted thereon rotatable therein, the combination of a shaft seal assembly on each end of each said shaft, said assembly consisting of a flanged housing, which is received in one of the slots of an end plate and extends therethrough, a plurality of plastic rings in said housing, a washer at either side of said rings, a spring ring in contact with the outboard washer, an end member in contact with said spring ring and threadedly secured to the flange of said housing, and a flinger wheel mounted on said shaft, inboard of said end plate and in contact with the housing of said seal.

2. The structure of claim 1, including a flanged, channel shaped filler plate received in said slot above and in contact with said housing and having its flanges secured to the outside of said end plate.

3. The structure of claim 1, in which said plastic rings consist of a polytetrafluoroethyline polymer.

References Cited in the file of this patent
UNITED STATES PATENTS

| | | |
|---|---|---|
| 558,876 | Jennings | Apr. 21, 1896 |
| 1,466,638 | Browne | Aug. 28, 1923 |
| 1,687,660 | Cummer | Oct. 16, 1928 |
| 2,646,959 | Carver | July 28, 1953 |
| 2,727,732 | Plumb et al. | Dec. 20, 1955 |
| 2,745,687 | Stack | May 15, 1956 |
| 2,807,483 | Cornelius | Sept. 24, 1957 |
| 2,831,325 | White | Apr. 22, 1958 |